(12) United States Patent
Tanaka et al.

(10) Patent No.: US 11,496,168 B2
(45) Date of Patent: Nov. 8, 2022

(54) RADIO FREQUENCY CIRCUIT, RADIO FREQUENCY MODULE, AND COMMUNICATION DEVICE

(71) Applicant: Murata Manufacturing Co., Ltd., Kyoto (JP)

(72) Inventors: Satoshi Tanaka, Nagaokakyo (JP); Hirotsugu Mori, Nagaokakyo (JP); Hidenori Obiya, Nagaokakyo (JP); Morio Takeuchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 89 days.

(21) Appl. No.: 17/172,268

(22) Filed: Feb. 10, 2021

(65) Prior Publication Data

US 2021/0258028 A1 Aug. 19, 2021

(30) Foreign Application Priority Data

Feb. 14, 2020 (JP) .............................. JP2020-023058

(51) Int. Cl.
*H04B 1/04* (2006.01)

(52) U.S. Cl.
CPC ......... *H04B 1/0483* (2013.01); *H04B 1/0458* (2013.01); *H04B 2001/0408* (2013.01); *H04B 2001/0491* (2013.01)

(58) Field of Classification Search
CPC ...... H04B 1/005; H04B 1/0053; H04B 1/006; H04B 1/0067; H04B 1/0071; H04B 1/02; H04B 1/04; H04B 1/0458; H04B 1/0483; H04B 1/38; H04B 1/40; H04B 2001/0408; H04B 2001/0416; H03F 3/189;
(Continued)

(56) References Cited

U.S. PATENT DOCUMENTS 6,405,025 B1 * 6/2002 Keski-Mattinen ..... H04B 1/006
455/343.1
6,819,941 B2 * 11/2004 Dening ................ H04B 1/0053
455/552.1
(Continued)

FOREIGN PATENT DOCUMENTS

JP 2010-011062 A 1/2010
JP 2016-144120 A 8/2016

OTHER PUBLICATIONS

CMCC, CATT, ZTE, Huawei, Hisilicon, Vivo, Qualcomm, Proposal on release independent issue for PC2 EN-DC TDD+TDD, 3GPP TSG-RAN WG4 Meeting #92-bis, Oct. 14-18, 2019, pp. 1-3, R4-1910769, Chongqing, China.
(Continued)

*Primary Examiner* — Quochien B Vuong
(74) *Attorney, Agent, or Firm* — Pearne & Gordon LLP

(57) ABSTRACT

A radio frequency circuit includes an amplifier capable of amplifying a first radio frequency signal and a second radio frequency signal that has a frequency different from a frequency of the first radio frequency signal. Here, the amplifier uses a first power-supply voltage to amplify one of the first radio frequency signal and the second radio frequency signal and uses a second power-supply voltage to amplify both the first radio frequency signal and the second radio frequency signal together. A value of the second power-supply voltage is greater than a value of the first power-supply voltage.

20 Claims, 13 Drawing Sheets

(58) Field of Classification Search
CPC ... H03F 3/195; H03F 3/20; H03F 3/21; H03F 3/213
See application file for complete search history.

(56) References Cited

U.S. PATENT DOCUMENTS

| | | | |
|---|---|---|---|
| 9,467,940 B2* | 10/2016 | Zhang | H04B 1/0458 |
| 10,439,670 B2* | 10/2019 | Kang | H04B 1/006 |
| 10,630,375 B1* | 4/2020 | Khlat | H04B 1/04 |
| 2014/0111178 A1 | 4/2014 | Khlat et al. | |
| 2016/0227549 A1 | 8/2016 | Shako et al. | |

OTHER PUBLICATIONS

LG Electronics, CR of Annex.B for NR V2X side conditions, 3GPP TSG-RAN WG4 Electronic Meeting #95-e, May 25-Jun. 5, 2020, pp. 1-3, R4-2008591.

* cited by examiner

RADIO FREQUENCY CIRCUIT, RADIO FREQUENCY MODULE, AND COMMUNICATION DEVICE

CROSS REFERENCE TO RELATED APPLICATION

The present application is based on and claims priority of Japanese Patent Application No. 2020-023058 filed on Feb. 14, 2020. The entire disclosure of the above-identified application, including the specification, drawings and claims is incorporated herein by reference in its entirety.

TECHNICAL FIELD

The present disclosure relates to radio frequency circuits, radio frequency modules, and communication devices.

BACKGROUND

The 3rd Generation Partnership Project (3G PP) is working on the standardization of the 5th Generation New Radio (5G NR). In 5G NR, the selection of a wider channel bandwidth is becoming available, with a greater number of channel bandwidths selectable in communication bands. In some cases, a transmission channel in a wider channel bandwidth is subjected to division.

BRIEF SUMMARY

However, a plurality of signals of divided channels, when multiplexed, result in an increased difference between the peak power and the average power. For this reason, the conventional technologies (see, for example, United States Patent Application Publication No. 2014/0111178) can have a problem of an increased load on a power amplifier and reduced transmission power.

In view of this, the present disclosure provides radio frequency circuits, radio frequency modules, and communication devices capable of inhibiting the reduction in a transmission power in a simultaneous transmission of a plurality of radio frequency signals.

The radio frequency circuit according to an aspect of the present disclosure includes an amplifier that amplifies a first radio frequency signal and a second radio frequency signal that has a frequency different from a frequency of the first radio frequency signal. Here, the amplifier uses a first power-supply voltage to amplify one of the first radio frequency signal and the second radio frequency signal and uses a second power-supply voltage to amplify both the first radio frequency signal and the second radio frequency signal together, and a value of the second power-supply voltage is greater than a value of the first power-supply voltage.

The present disclosure is capable of inhibiting the reduction in a transmission power in a simultaneous transmission of a plurality of radio frequency signals.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
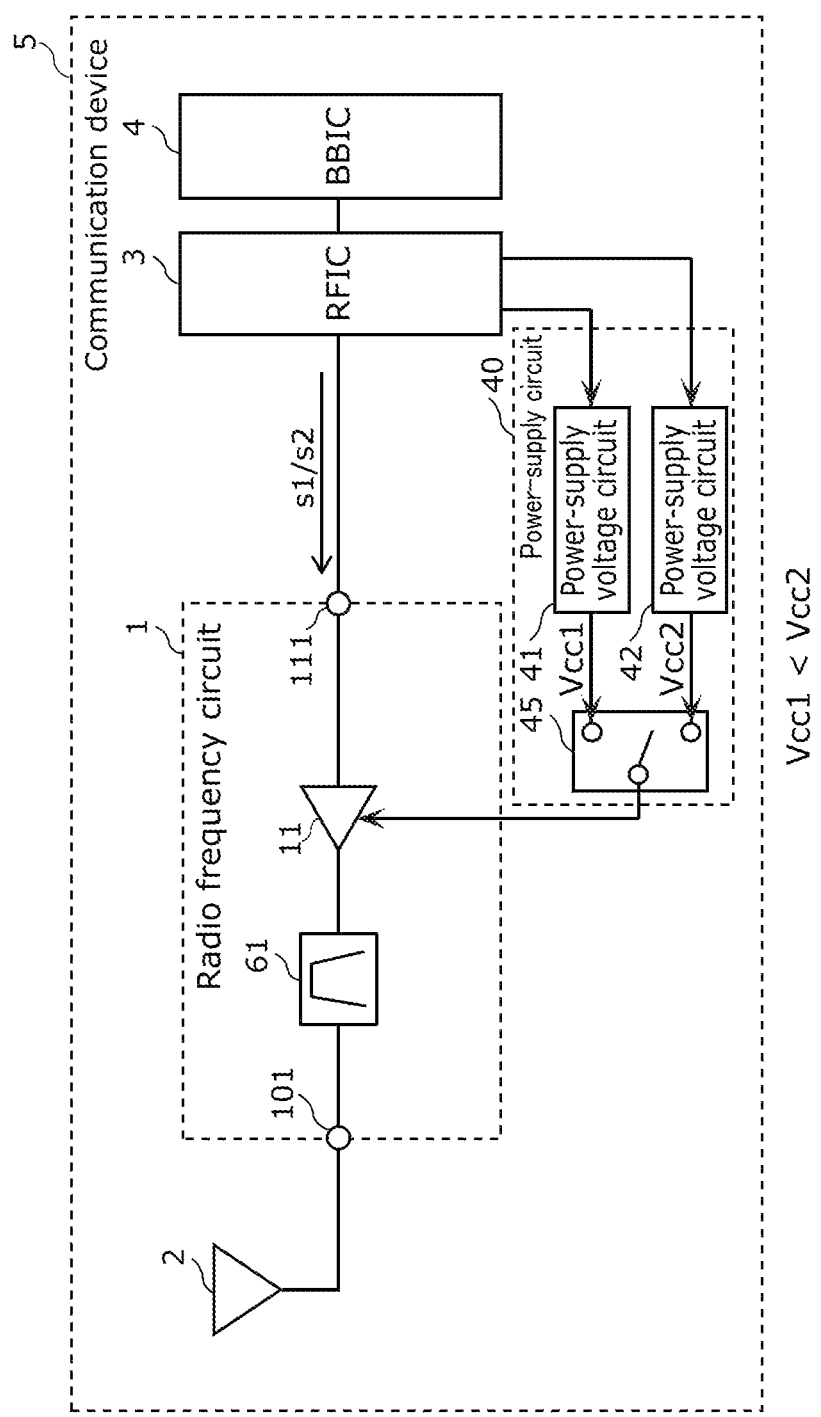
FIG. 1 is a diagram showing the circuit configurations of a radio frequency circuit and a communication device according to Embodiment 1.

The following describes in detail the embodiments according to the present disclosure with reference to the drawings. Note that the following embodiments show a comprehensive or specific example of the present disclosure. The numerical values, shapes, materials, structural elements, the arrangement and connection of the structural elements, etc. shown in the following embodiments are mere examples, and thus are not intended to limit the present disclosure.

Note that the drawings are schematic diagrams in which emphasis, omission, or ratio adjustment has been applied where necessary to illustrate the present disclosure. The drawings are thus not necessarily exact illustration of the present disclosure, and may illustrate shapes, positional relationships, and ratios differently from the actual ones. In the drawings, substantially the same structural elements are assigned the same reference marks, and their repetitive description may be omitted or simplified.

In the radio frequency circuit according to an aspect of the present disclosure, "connected" means not only the case where elements are directly connected by a connection terminal and/or a wiring conductor, but also the case where elements are electrically connected via another circuit element. Also, "connected between A and B" means that an element is connected to A and B on a path that connects A and B.

Embodiment 1

1.1 Circuit Configurations of Radio Frequency Circuit 1 and Communication Device 5

With reference to FIG. 1, the following describes the circuit configurations of radio frequency circuit 1 and communication device 5 according to the present embodiment. FIG. 1 is a diagram showing the circuit configurations of radio frequency circuit 1 and communication device 5 according to Embodiment 1.

1.1.1 Circuit Configuration of Communication Device 5

The circuit configuration of communication device 5 will be described first. As shown in FIG. 1, communication device 5 according to the present embodiment includes radio frequency circuit 1, antenna 2, RFIC 3, BBIC 4, and power-supply circuit 40.

Radio frequency circuit 1 is an example of the radio frequency circuit that transfers a radio frequency signal processed by a signal processing circuit. Radio frequency circuit 1 transfers a radio frequency signal between antenna 2 and RFIC 3. More specifically, radio frequency circuit 1 includes a transmission circuit capable of a simultaneous transmission of first radio frequency signal s1 and second radio frequency signal s2. Here, frequency f1 of first radio frequency signal s1 is different from frequency f2 of second radio frequency signal s2. Center frequencies, for example, are used as the frequencies of the radio frequency signals. A detailed circuit configuration of radio frequency circuit 1 will be described later.

Antenna 2, which is connected to antenna connection terminal 101 of radio frequency circuit 1, transmits first radio frequency signal s1 and second radio frequency signal s2.

RFIC 3 is an example of the signal processing circuit that processes a radio frequency signal. More specifically, RFIC 3 performs signal processing, such as up-conversion, on a transmission signal inputted from BBIC 4, and outputs the resulting radio frequency transmission signal to a transmission signal path of radio frequency circuit 1. RFIC 3 according to the present embodiment outputs first radio frequency signal s1 and second radio frequency signal s2 to radio frequency circuit 1. RFIC 3 also controls a switch, an amplifier, and so forth included in radio frequency circuit 1.

BBIC 4 is a baseband signal processing circuit that performs signal processing by use of an intermediate frequency band, the frequency of which is lower than that of a radio frequency signal transferred by radio frequency circuit 1. Used as the signal processed by BBIC 4 is, for example, an image signal for image display, and/or a sound signal for telephone conversation through a speaker.

Power-supply circuit 40 outputs first power-supply voltage Vcc1 and second power-supply voltage Vcc2 to power amplifier 11. Power-supply circuit 40 operates on power supplied from a power source (not illustrated), for example, to apply first power-supply voltage Vcc1 and second power-supply voltage Vcc2 to power amplifier 11. More specifically, on the basis of a control signal from RFIC 3, power-supply circuit 40 applies first power-supply voltage Vcc1 or second power-supply voltage Vcc2 to power amplifier 11. Power-supply circuit 40 includes power-supply voltage circuit 41 for applying first power-supply voltage Vcc1, power-supply voltage circuit 42 for applying second power-supply voltage Vcc2, and switch 45.

Switch 45 switches between connecting power amplifier 11 and power-supply voltage circuit 41, and between connecting power amplifier 11 and power-supply voltage circuit 42. Stated differently, switch 45 switches between first power-supply voltage Vcc1 and second power-supply voltage Vcc2 to be applied to power amplifier 11.

More specifically, switch 45 includes a common terminal, a first terminal, and a second terminal. The common terminal of switch 45 is connected to power amplifier 11. The first terminal of switch 45 is connected to power-supply voltage circuit 41. The second terminal of switch 45 is connected to power-supply voltage circuit 42. Having such connection structure, switch 45 connects one of the first terminal and the second terminal to the common terminal. This enables to switch between first power-supply voltage Vcc1 and second power-supply voltage Vcc2 to be applied to power amplifier 11. Switch 45 is implemented, for example, as a single pole double throw (SPDT) switch circuit.

Note that antenna 2, BBIC 4, and power-supply circuit 40 are not essential structural elements of communication device 5 according to the present embodiment.

1.1.2 Circuit Configuration of Radio Frequency Circuit 1

Next, the circuit configuration of radio frequency circuit 1 will be described. As shown in FIG. 1, radio frequency circuit 1 includes power amplifier 11, filter 61, antenna connection terminal 101, and transmission input terminal 111.

Power amplifier 11 is an example of the amplifier capable of amplifying first radio frequency signal s1 and second radio frequency signal s2 that has the frequency different from the frequency of first radio frequency signal s1. Power amplifier 11 is connected to filter 61. Power amplifier 11 uses first power-supply voltage Vcc1 to amplify one of first radio frequency signal s1 and second radio frequency signal s2, and uses second power-supply voltage Vcc2 to amplify both first radio frequency signal s1 and second radio frequency signal s2 together.

Here, the value of second power-supply voltage Vcc2 is greater than the value of first power-supply voltage Vcc1. An additional use of second power-supply voltage Vcc2 having a greater value than the value of first power-supply voltage Vcc1 enables power amplifier 11 to support a high power class (e.g., Power Class 1.5, Power Class 2, etc.) even in the amplification of both first radio frequency signal s1 and second radio frequency signal s2 together.

A power class is a classification of the output power of a terminal device defined, for example, as the maximum output power. A smaller power class value indicates that the terminal device is capable of supporting a greater power output. The maximum output power is defined by the output power at the antenna end of a terminal device. The maximum output power is measured by a method defined, for example, by 3G PP. In FIG. 1, for example, the maximum output power is measured by measuring the radiative power at antenna 2. Instead of measuring the radiative power, the output power of antenna 2 is also measurable by connecting a measurement device (e.g., spectrum analyzer) to a terminal that has been provided in proximity to antenna 2.

Either a fixed power-supply voltage or a variable power-supply voltage may be used as first power-supply voltage Vcc1 and second power-supply voltage Vcc2. For example, voltages fixed to 3 V and 5 V may be used as first power-supply voltage Vcc1 and second power-supply voltage Vcc2, respectively. Alternatively, voltages that have been adjusted by a method of Envelope Tracking (ET) or Average Power Tracking (APT) in accordance with an input signal to power amplifier 11, for example, may be used as first power-supply voltage Vcc1 and second power-supply voltage Vcc2.

In general, an ET amplification mode (hereinafter referred to as ET mode) reduces the power consumption of the power amplifier but increases the signal distortion, compared to an APT amplification mode (hereinafter referred to as APT mode). This is because, in the ET mode, a power-supply voltage is applied in accordance with the power of an input signal to enable the power amplifier to operate in a compressed region. In contrast, the APT mode is inferior to the ET mode in terms of the reduction in the power consumption, but superior to the ET mode in terms of the reduction in the signal distortion.

In view of this, power amplifier 11 may operate, for example, in the ET mode to amplify a Long Term Evolution (LTE) signal and in the APT mode to amplify a 5GNR signal. The wider the frequency bandwidth of a radio frequency signal amplified by the power amplifier, the wider the frequency bandwidth such power amplifier needs to be capable of amplification. As such, the resulting radio frequency signal amplified has increased the signal distortion. In particular, the wider the channel bandwidth of a radio frequency signal amplified in a power amplifier circuit, the greater the signal distortion of the resulting radio frequency signal amplified. For this reason, the use of the ET mode to amplify an LTE signal having a relatively narrow channel bandwidth promotes the reduction in the power consumption. Further, the use of the APT mode to amplify a 5GNR signal having a relatively wide channel bandwidth attenuates the signal distortion.

Alternatively, power amplifier 11 may operate in the APT mode to amplify an LTE signal and in the ET mode to amplify a 5GNR signal. This prioritizes the reduction in the power consumption in the amplification of a 5GNR signal which is likely to consume much power.

Alternatively, power amplifier 11 may operate, for example, in the ET mode to amplify one of first radio frequency signal s1 and second radio frequency signal s2 and in the APT mode to amplify both first radio frequency signal s1 and second radio frequency signal s2 together. The use of the ET mode to amplify a single radio frequency signal having a relatively narrow channel bandwidth promotes the reduction in the power consumption. Further, the use of the APT mode to amplify two radio frequency signals having a relatively wide channel bandwidth attenuates the signal distortion.

Alternatively, power amplifier 11 may operate in the APT mode to amplify one of first radio frequency signal s1 and second radio frequency signal s2 and in the ET mode to amplify both first radio frequency signal s1 and second radio frequency signal s2 together. This prioritizes the reduction in the power consumption in the amplification of two radio frequency signals which are likely to consume a much power.

In the use of a variable power-supply voltage, the time average value in a predetermined period or another descriptive statistics value (e.g., median value) may be used as the value of first power-supply voltage Vcc1 and the value of second power-supply voltage Vcc2. Here, non-limiting examples of the predetermined period include a period equivalent to one frame of a radio frequency signal.

Note that bias signal adjustment may be performed in power amplifier 11. For example, in the amplification of both first radio frequency signal s1 and second radio frequency signal s2 together, (i) a first bias signal may be used under a condition that the channel bandwidth of first radio frequency signal s1 and the channel bandwidth of second radio frequency signal s2 are identical, and (ii) a second bias signal different from the first bias signal may be used under a condition that the channel bandwidth of first radio frequency signal s1 and the channel bandwidth of second radio frequency signal s2 are different. Here, the bias signals may be either bias currents or bias voltages.

Filter 61 has a passband that supports the communication band of first radio frequency signal s1 and the communication band of second radio frequency signal s2. Stated differently, filter 61 passes first radio frequency signal s1 and second radio frequency signal s2. Filter 61 according to the present embodiment is connected between antenna connection terminal 101 and power amplifier 11.

Non-limiting examples of filter 61 include an acoustic wave filter utilizing surface acoustic wave (SAW), an acoustic wave filter utilizing bulk acoustic wave (BAW), an LC resonant filter, and a dielectric filter, or any combination of these filters.

Note that filter 61, antenna connection terminal 101, and transmission input terminal 111 are not essential structural elements of radio frequency circuit 1 according to the present embodiment.

1.2 Examples of First Radio Frequency Signal s1 and Second Radio Frequency Signal s2

The following describes examples of first radio frequency signal s1 and second radio frequency signal s2. Each of first radio frequency signal s1 and second radio frequency signal s2 is a radio frequency (RF) signal used in a predetermined communication system. Such RF signal is an RF signal of a channel included in a predetermined communication band for the predetermined communication system.

Here, a communication system means a communication system that is configured using a Radio Access Technology (RAT). In the present embodiment, non-limiting examples of the communication system include a 5GNR system, an LTE system, and a Wireless Local Area Network (WLAN) system.

Also, a communication band means a frequency band that is predefined by a standard body, etc. for a communication system. Here, examples of the standard body include 3G PP and Institute of Electrical and Electronics Engineers (IEEE).

Examples of first radio frequency signal s1 and second radio frequency signal s2 to be used include signals of different channels included in a same communication band for a same communication system. Here, an example of the same communication band for the same communication system to be used is n77 (3300-4200 MHz) or n41 (2496-2690 MHz) for 5G NR. Simultaneous transmission of first radio frequency signal s1 and second radio frequency signal s2 as described above is known as intra-band carrier aggregation (CA). Note that an unlicensed band of 5 GHz or greater may be used as the same communication band for the same communication system.

In Japan, a plurality of mobile network operators (MNOs) are allocated to n77 for 5G NR. For example, a first MNO is allocated to 3600-3700 MHz, a second MNO to 3700-3800 MHz, a third MNO to 3800-3900 MHz, a fourth MNO to 3900-4000 MHz, and the second MNO again to 4000-4100 MHz. In such a case, the use of intra-band CA in the two bands to which the second MNO is allocated enables a more efficient use of the communication bands.

Examples of first radio frequency signal s1 and second radio frequency signal s2 to be used further include signals of different channels included in a same communication band for different communication systems. Here, an example of the same communication band for the different communication systems to be used is Band 41 for LTE (2496-2690 MHz) and n41 for 5G NR. Such simultaneous transmission of first radio frequency signal s1 and second radio frequency signal s2 is known as intra-band LTE-NR Dual Connectivity (EN-DC).

Examples of first radio frequency signal s1 and second radio frequency signal s2 to be used further include signals of different channels included in different communication bands for different communication systems. Here, an example of the different communication bands for the different communication systems to be used is Band 42 for LTE (3400-3600 MHz) and n77 for 5G NR. The following may also be used as the different communication bands for the different communication systems: Band 42 for LTE and n78 for 5G NR (3300-3800 MHz); Band 42 for LTE and n79 for 5G NR (4400-5000 MHz); Band 38 for LTE (2570-2620 MHz) and n41 for 5G NR (2496-2690 MHz); and Band 41 for LTE (2496-2690 MHz) and n38 for 5G NR (2570-2620 MHz). Such a simultaneous transmission of first radio frequency signal s1 and second radio frequency signal s2 is known as inter-band EN-DC. Note that unlicensed bands of 5 GHz or greater may be used as the different communication bands for different communication systems.

Examples of first radio frequency signal s1 and second radio frequency signal s2 to be used further include signals of different channels included in different communication bands for a same communication system. Here, an example of the different communication bands for the same communication system to be used is n77 and n78 (3300-3800 MHz) for 5G NR.

Note that the specific communication systems and communication bands described above are some of the examples, and thus the present disclosure is not limited to such communication systems and communication bands. For example, one of or both of first radio frequency signal s1 and second radio frequency signal s2 may be signal(s) included in an NR-U band included in an unlicensed band of 5 GHz or greater and/or WLAN signal(s).

1.3 Operation of Communication Device 5

Figure 2:
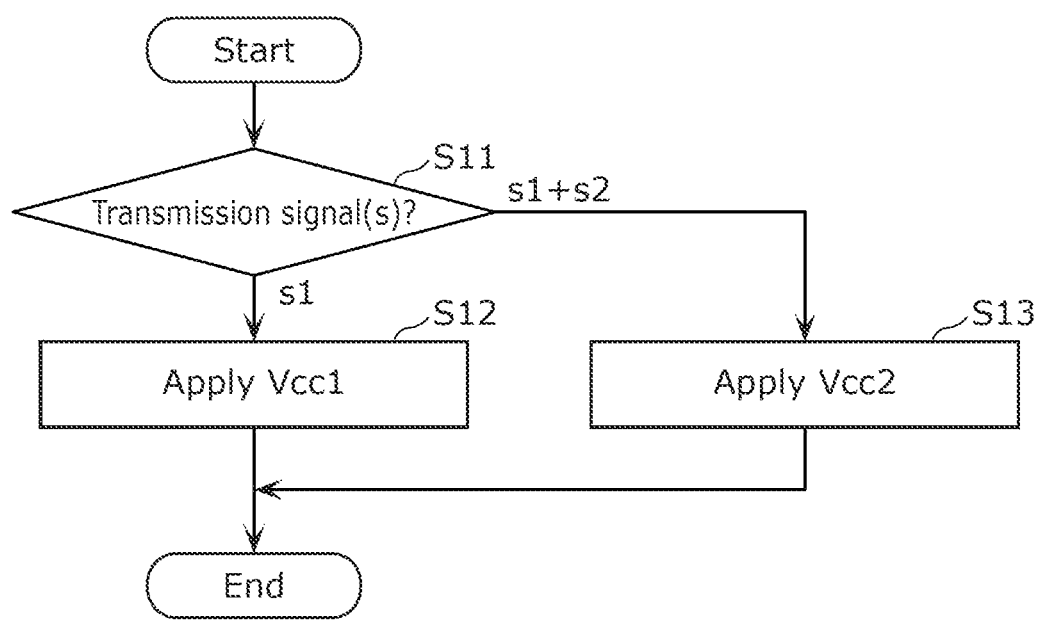
FIG. 2 is a flowchart of the operation performed by the communication device according to Embodiment 1.
Figure 3:
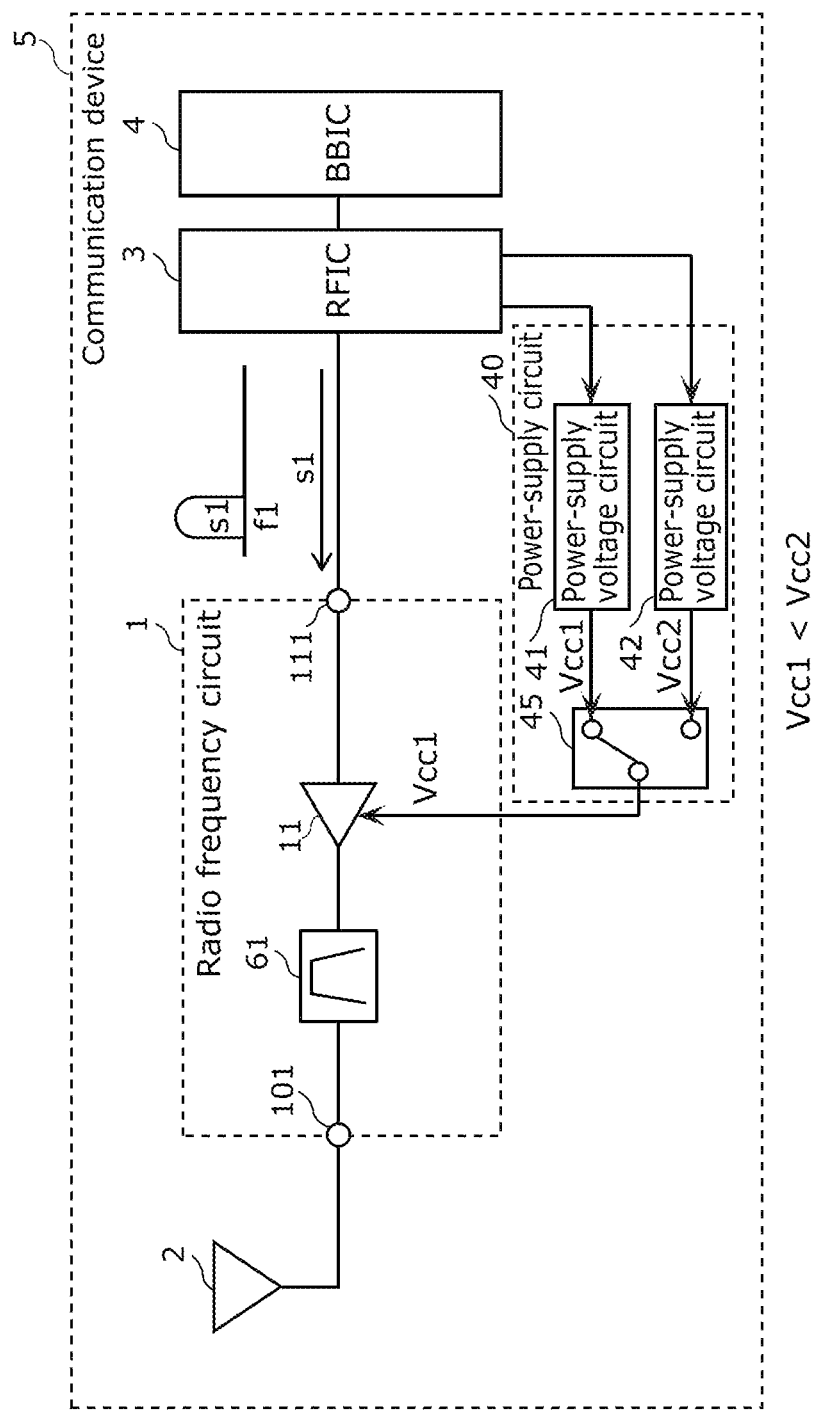
FIG. 3 is a circuit diagram showing a connection status of the communication device that is transmitting a first radio frequency signal in Embodiment 1.
Figure 4:
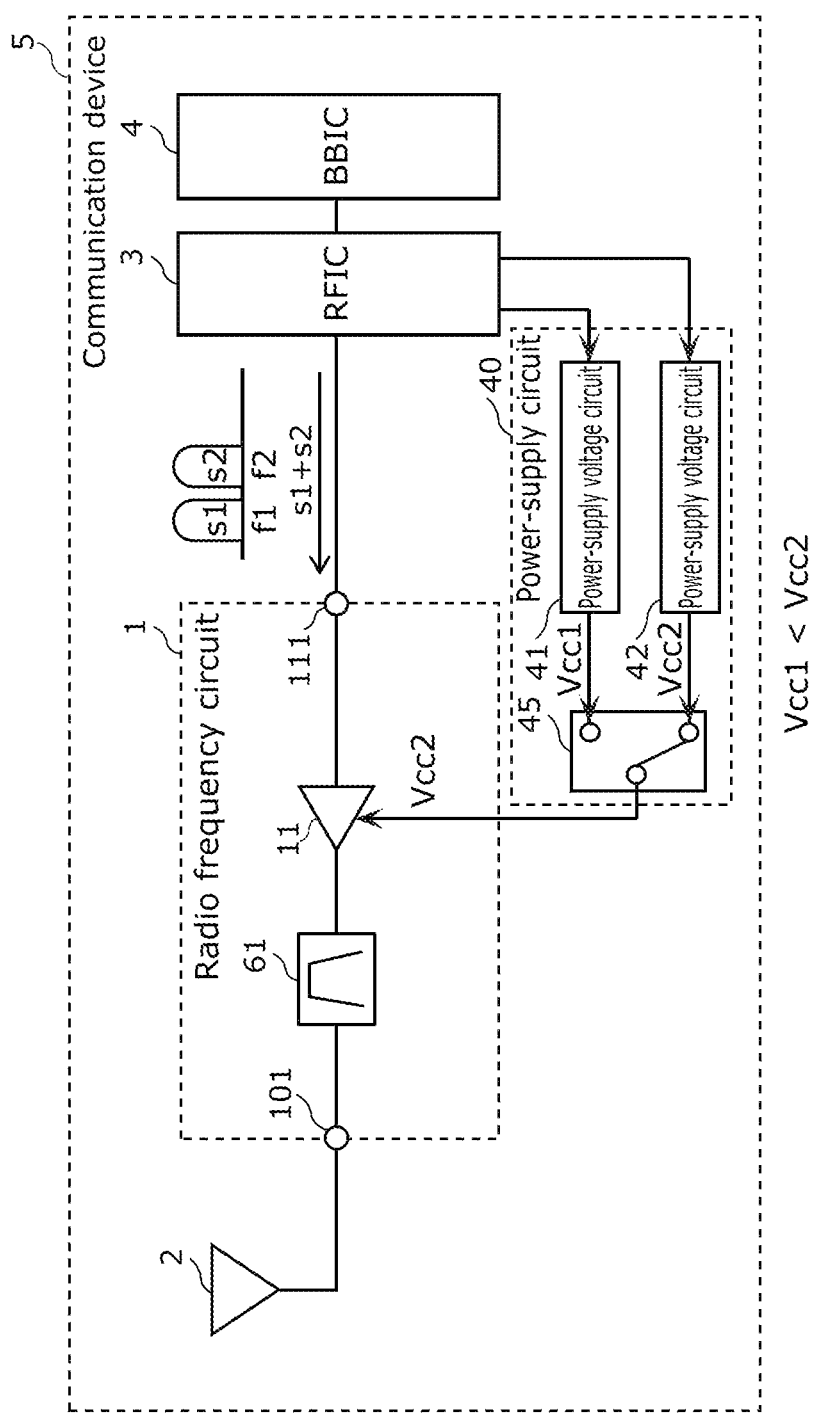
FIG. 4 is a circuit diagram showing a connection status of the communication device that is simultaneously transmitting the first radio frequency signal and a second radio frequency signal in Embodiment 1.

With reference to FIG. 2 through FIG. 4, the operation performed by communication device 5 with the above configuration will be described. FIG. 2 is a flowchart of the operation performed by communication device 5 according to Embodiment 1. FIG. 3 is a circuit diagram showing a connection status of communication device 5 that is transmitting first radio frequency signal s1 in Embodiment 1. FIG. 4 is a circuit diagram showing a connection status of communication device 5 that is simultaneously transmitting first radio frequency signal s1 and second radio frequency signal s2 in Embodiment First, as shown in FIG. 2, transmission signal(s) is judged (S11). Here, in the case where the transmission signal(s) is first radio frequency signal s1 (s1 in S11), first power-supply voltage Vcc1 is applied to power amplifier 11 (S12). As shown in FIG. 3, for example, in the case where first radio frequency signal s1 is inputted from RFIC 3 to transmission input terminal 111, switch 45 connects power amplifier 11 and power-supply voltage circuit 41, as a result of which first power-supply voltage Vcc1 is applied to power amplifier 11.

In the case where the transmission signals are first radio frequency signal s1 and second radio frequency signal s2 (s1+s2 in S11), second power-supply voltage Vcc2 is applied to power amplifier 11 (S13). As shown in FIG. 4, for example, in the case where first radio frequency signal s1 and second radio frequency signal s2 are inputted from RFIC 3 to transmission input terminal 111, switch 45 connects power amplifier 11 and power-supply voltage circuit 42, as a result of which second power-supply voltage Vcc2 is applied to power amplifier 11.

Note that the judgment and control performed in the steps in FIG. 2 may be performed, for example, by a controller (not illustrated) in RFIC 3. Note that the controller may be included in radio frequency circuit 1.

As described above, radio frequency circuit 1 according to the present embodiment includes power amplifier 11 capable of amplifying first radio frequency signal s1 and second radio frequency signal s2 that has a frequency different from the frequency of first radio frequency signal s1. Here, power amplifier 11 uses first power-supply voltage Vcc1 to amplify one of first radio frequency signal s1 and second radio frequency signal s2 and uses second power-supply voltage Vcc2 to amplify both first radio frequency signal s1 and second radio frequency signal s2 together, and the value of second power-supply voltage Vcc2 is greater than the value of first power-supply voltage Vcc1.

In this configuration, a higher power-supply voltage is used to amplify both first radio frequency signal s1 and second radio frequency signal s2 together. This configuration alleviates the limitation of the output power of power amplifier 11 in the case where a single power amplifier 11 simultaneously amplifies a plurality of radio frequency signals, thus inhibiting the reduction in the transmission power.

Figure 5:
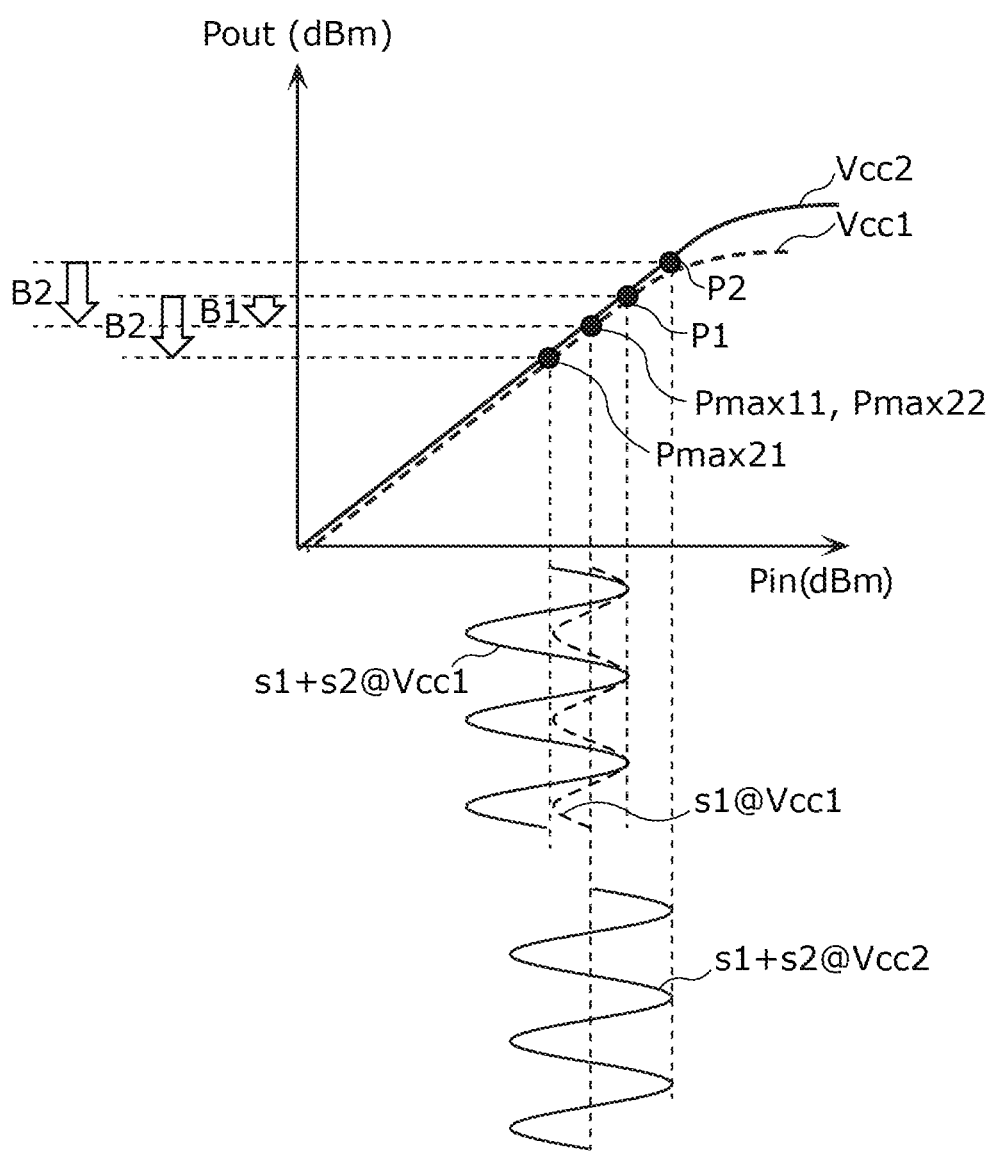
FIG. 5 is a graph showing the gain characteristics of a power amplifier according to Embodiment 1.

Here, with reference to FIG. 5, the alleviation of output power limitation will be described in detail. FIG. 5 is a graph showing the gain characteristics of power amplifier 11 according to Embodiment 1. In FIG. 5, the horizontal axis represents the input power and the vertical axis represents the output power.

As shown in FIG. 5, in the case where the input power increases but are smaller than the predetermined power, the output power linearly increases (the linear region). In contrast, in the case where the input power increases greater than the predetermined power, the output power tends not to increase to saturate after a while (the nonlinear region). In such a nonlinear region, the distortion of an amplified signal increases, as a result of which the quality requirement is not satisfied. In view of this, the output power of a radio frequency signal in power amplifier 11 is limited to the output power corresponding to the predetermined power. The predetermined power, which separates the linear region and the nonlinear region as described above, is represented as, for example, the 1 dB compression point.

In the amplification of a modulated radio frequency signal, a back-off margin corresponding to the difference between the peak power and the average power of the signal needs to be considered. In FIG. 5, for example, in the amplification of first radio frequency signal s1 using first power-supply voltage Vcc1, the output power of first radio frequency signal s1 is limited to point Pmax11, which is lower than 1 dB compression point P1 by back-off margin B1. Meanwhile, in the amplification of multiplexed signal s1+s2, which is a signal obtained by multiplexing first radio frequency signal s1 and second radio frequency signal s2, the output power of multiplexed signal s1+s2 is limited to point Pmax21, which is lower than 1 dB compression point P1 by back-off margin B2.

The difference between the peak power and the average power of multiplexed signal s1+s2 is greater than the difference between the peak power and the average power of radio frequency signal s1. As such, back-off margin B2 for multiplexed signal s1+s2 is greater than back-off margin B1 for first radio frequency signal s1. For this reason, in the amplification of multiplexed signal s1+s2 using first power-supply voltage Vcc1, the output power of multiplexed signal s1+s2 is limited to a lower level than that of the output power of first radio frequency signal s1.

In view of this, the present embodiment uses second power-supply voltage Vcc2 to amplify multiplexed signal s1+s2. As shown in FIG. 5, in power amplifier 11 to which second power-supply voltage Vcc2 that is higher than first power-supply voltage Vcc1 has been applied, the 1 dB compression point increases from P1 to P2. Consequently, in the amplification of multiplexed signal s1+s2, the limitation of the output power of multiplexed signal s1+s2 is alleviated, and the maximum output power level shifts from point Pmax21 to point Pmax22, which is lower than 1 dB compression point P2 by back-off margin B2.

As described above, radio frequency circuit 1 according to the present embodiment applies a higher power-supply voltage to power amplifier 11 for the amplification of both first radio frequency signal s1 and second radio frequency signal s2 together, thereby inhibiting the reduction in a transmission power.

In radio frequency circuit 1 according to the present embodiment, for example, first radio frequency signal s1 and second radio frequency signal s2 may be radio frequency signals of different channels included in a same communication band for a same communication system. Here, the same communication band for the same communication system may be one of n77, n41, and n74 for 5G NR, or an unlicensed band of 5 GHz or greater.

This configuration inhibits the reduction in a transmission power in a simultaneous transmission of radio frequency signals of different channels included in the same communication band for the same communication system (e.g., one of n77, n41, and n74 for 5G NR, or an unlicensed band of 5 GHz or greater).

In radio frequency circuit 1 according to the present embodiment, for example, first radio frequency signal s1 and second radio frequency signal s2 may be radio frequency signals of different channels included in different communication bands for different communication systems. Here, the different communication bands for the different communication systems may include one of n77, n41, and n74 for 5G NR, or an unlicensed band of 5 GHz or greater.

This configuration inhibits the reduction in a transmission power in simultaneous transmission of radio frequency signals in the different communication bands for the different communication systems (e.g., Band 42 for LTE and n77 for 5G NR).

In radio frequency circuit 1 according to the present embodiment, for example, first radio frequency signal s1 and second radio frequency signal s2 may be radio frequency signals of different channels included in a same communication band for different communication systems. Here, the same communication band for the different communication systems may be Band 41 for LTE and n41 for 5G NR.

This configuration inhibits the reduction in a transmission power in a simultaneous transmission of radio frequency signals in the same communication band for the different communication systems (e.g., Band 41 for LTE and n41 for 5G NR).

In radio frequency circuit 1 according to the present embodiment, for example, first radio frequency signal s1 and second radio frequency signal s2 may be radio frequency signals of different channels included in different communication bands for a same communication system. Here, the different communication bands for the same communication system may be n77 and n78 for 5G NR.

This configuration inhibits the reduction in transmission power in a simultaneous transmission of radio frequency signals in the different communication bands for the same communication system (e.g., n77 and n78 for 5G NR).

In radio frequency circuit 1 according to the present embodiment, for example, power amplifier 11 may operate in one of an envelope tracking mode and an average power tracking mode to amplify one of first radio frequency signal s1 and second radio frequency signal s2, and operate in the other of the envelope tracking mode and the average power tracking mode to amplify both first radio frequency signal s1 and second radio frequency signal s2 together.

In this configuration, power amplifier 11 switches between the ET mode and the APT mode depending on whether radio frequency signal(s) to be amplified are one of or both of first radio frequency signal s1 and second radio frequency signal s2. This enables the selection of an appropriate amplification mode for the radio frequency signal(s) to be amplified, thus reducing the power consumption and/or the signal distortion.

In radio frequency circuit 1 according to the present embodiment, for example, power amplifier 11 may operate in the envelope tracking mode to amplify one of first radio frequency signal s1 and second radio frequency signal s2, and operate in the average power tracking mode to amplify both first radio frequency signal s1 and second radio frequency signal s2 together.

This configuration uses the ET mode to amplify a single radio frequency signal having a relatively narrow channel bandwidth, thereby promoting the reduction in the power consumption. Also, this configuration uses the APT mode to amplify two radio frequency signals having a relatively wide channel bandwidth, thereby reducing the signal distortion.

In radio frequency circuit 1 according to the present embodiment, for example, power amplifier 11 may operate in the average power tracking mode to amplify one of first radio frequency signal s1 and second radio frequency signal s2, and operate in the envelope tracking mode to amplify both first radio frequency signal s1 and second radio frequency signal s2 together.

This configuration prioritizes the reduction in the power consumption in the amplification of two radio frequency signals that are likely to consume a much power.

In radio frequency circuit 1 according to the present embodiment, for example, power amplifier 11 may support Power Class 1.5 or Power Class 2 to amplify both first radio frequency signal s1 and second radio frequency signal s2 together using second power-supply voltage Vcc2.

In this configuration, a higher power-supply voltage is used to amplify both first radio frequency signal s1 and second radio frequency signal s2 together. This configuration thus alleviates the limitation of the output power of power amplifier 11 in the case where a single power amplifier 11 simultaneously amplifies a plurality of radio frequency signals. This enables power amplifier 11 to support a higher power class of Power Class 1.5 or Power Class 2, which is higher than Power Class 3. The alleviation of the output power limitation achieved by the above configuration is highly effective, particularly for Power Class 1.5 or Power Class 2, which requires power amplifier 11 to support higher output power than Power Class 3.

In radio frequency circuit 1 according to the present embodiment, for example, to amplify both first radio frequency signal s1 and second radio frequency signal s2 together, power amplifier 11 may use (i) a first bias signal under a condition that the channel bandwidth of first radio frequency signal s1 and the channel bandwidth of second radio frequency signal s2 are identical, and (ii) a second bias signal that is different from the first bias signal under a condition that the channel bandwidth of first radio frequency signal s1 and the channel bandwidth of second radio frequency signal s2 are different.

This configuration, in which bias signal adjustment is performed in accordance with the channel bandwidths of the radio frequency signals, is also capable of providing bias signals appropriate for the amplification of the two radio frequency signals. This configuration thus improves the power efficiency of power amplifier 11 and/or the quality of the amplified radio frequency signals.

Also, communication device 5 according to the present embodiment incudes: RFIC 3 that processes a radio frequency signal; and radio frequency circuit 1 that transfers the radio frequency signal between RFIC 3 and antenna 2.

Communication device 5 with the above configuration achieves the same effects as those achieved by radio frequency circuit 1.

Embodiment 2

The following describes Embodiment 2. The present embodiment is different from Embodiment 1 mainly in that the power amplifier is also capable of amplifying a third radio frequency signal. The following focuses on the difference from Embodiment 1 to describe the present embodiment with reference to the drawings.

Figure 6:
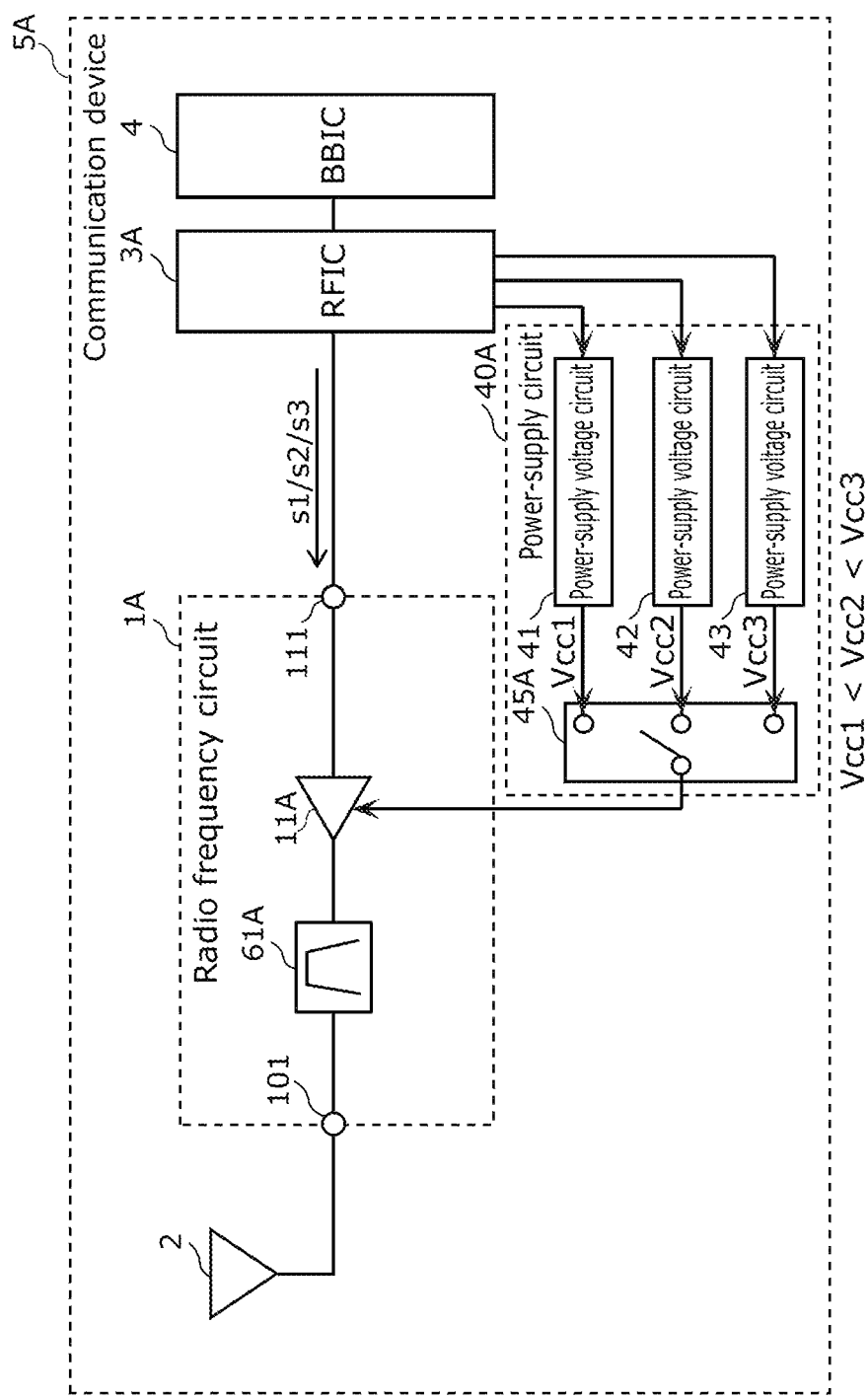
FIG. 6 is a diagram showing the circuit configurations of a radio frequency circuit and a communication device according to Embodiment 2.

2.1 Circuit Configurations of Radio Frequency Circuit 1A and Communication Device 5A With reference to FIG. 6, the following describes the circuit configurations of radio frequency circuit 1A and communication device 5A according to the present embodiment. FIG. 6 is a diagram showing the circuit configurations of radio frequency circuit 1A and communication device 5A according to Embodiment 2.

2.1.1 Circuit Configuration of Communication Device 5A

The circuit configuration of communication device 5A will be described first. As shown in FIG. 6, communication device 5A according to the present embodiment includes radio frequency circuit 1A, antenna 2, RFIC 3A, BBIC 4, and power-supply circuit 40A.

Radio frequency circuit 1A is an example of the radio frequency circuit that transfers a radio frequency signal processed by the signal processing circuit. Radio frequency circuit 1A includes a transmission circuit that is capable of a simultaneous transmission of first radio frequency signal s1 and second radio frequency signal s2 and a simultaneous transmission of first radio frequency signal s1 and third radio frequency signal s3. Here, frequency f1 of first radio frequency signal s1, frequency f2 of second radio frequency signal s2, and frequency f3 of third radio frequency signal s3 are different. Center frequencies, for example, are used as f1, f2, and f3. A detailed circuit configuration of radio frequency circuit 1A will be described later.

RFIC 3A is an example of the signal processing circuit that processes a radio frequency signal. More specifically, RFIC 3A performs signal processing, such as up-conversion, on a transmission signal inputted from BBIC 4, and outputs the resulting radio frequency transmission signal to a transmission signal path of radio frequency circuit 1A. RFIC 3A according to the present embodiment outputs first radio frequency signal s1, second radio frequency signal s2, and third radio frequency signal s3 to radio frequency circuit 1A. RFIC 3A also controls a switch, an amplifier, and so forth included in radio frequency circuit 1A.

Power-supply circuit 40A operates on power supplied from a power source (not illustrated) to apply a power-supply voltage to power amplifier 11A. More specifically, on the basis of a control signal from RFIC 3A, power-supply circuit 40A applies first power-supply voltage Vcc1, second power-supply voltage Vcc2, or third power-supply voltage Vcc3 to power amplifier 11A. Power-supply circuit 40A includes power-supply voltage circuits 41 and 42, power-supply voltage circuit 43 for applying third power-supply voltage Vcc3, and switch 45A.

Switch 45A switches to connect power amplifier 11A to one of power-supply voltage circuit 41, power-supply voltage circuit 42, and power-supply voltage circuit 43. Stated differently, switch 45A switches among first power-supply voltage Vcc1, second power-supply voltage Vcc2, and third power-supply voltage Vcc3 to be applied to power amplifier 11A.

More specifically, switch 45A includes a common terminal, a first terminal, a second terminal, and a third terminal. The common terminal of switch 45A is connected to power amplifier 11A. The first terminal of switch 45A is connected to power-supply voltage circuit 41. The second terminal of switch 45A is connected to power-supply voltage circuit 42. The third terminal of switch 45A is connected to power-supply voltage circuit 43. Having such connection structure, switch 45A connects one of the first terminal, the second terminal, and the third terminal to the common terminal. This enables to switch among first power-supply voltage Vcc1, second power-supply voltage Vcc2, and third power-supply voltage Vcc3 to be applied to power amplifier 11A. Switch 45A is implemented, for example, as a single pole triple throw (SP3T) switch circuit.

Note that antenna 2, BBIC 4, and power-supply circuit 40A are not essential structural elements of communication device 5A according to the present embodiment.

2.1.2 Circuit Configuration of Radio Frequency Circuit 1A

Next, the circuit configuration of radio frequency circuit 1A will be described. As shown in FIG. 6, radio frequency circuit 1A includes power amplifier 11A, filter 61A, antenna connection terminal 101, and transmission input terminal 111.

Power amplifier 11A is an example of the amplifier capable of amplifying third radio frequency signal s3 that has a frequency different from the frequency of first radio frequency signal s1 and the frequency of second radio frequency signal s2, in addition to being capable of amplifying first radio frequency signal s1 and second radio frequency signal s2. Power amplifier 11A is connected to filter 61A. Here, the difference between frequency f1 of first radio frequency signal s1 and frequency f3 of third radio frequency signal s3 is greater than the difference between frequency f1 of first radio frequency signal s1 and frequency f2 of second radio frequency signal s2. Stated differently, the absolute value of f3-f1 is greater than the absolute value of f2-f1.

Note that the frequency channel of second radio frequency signal s2 may be adjacent to the frequency channel of first radio frequency signal s1. Stated differently, the lower limit frequency of the frequency channel of second radio frequency signal s2 may be aligned with the upper limit frequency of the frequency channel of first radio frequency signal s1. Alternatively, the upper limit frequency of the frequency channel of second radio frequency signal s2 may be aligned with the lower limit frequency of the frequency channel of first radio frequency signal s1. Note that "align" means not only the case where the frequencies are exactly the same as each other, but also the case where the frequencies are in substantially the same range. For example, an error on the order of some percent is allowed.

As with Embodiment 1, power amplifier 11A uses first power-supply voltage Vcc1 to amplify one of first radio frequency signal s1 and second radio frequency signal s2, and uses second power-supply voltage Vcc2 to amplify both first radio frequency signal s1 and second radio frequency signal s2 together. In addition, power amplifier 11A according to the present embodiment uses third power-supply voltage Vcc3 to amplify both first radio frequency signal s1 and third radio frequency signal s3 together.

Here, the value of third power-supply voltage Vcc3 is greater than the value of first power-supply voltage Vcc1 and the value of second power-supply voltage Vcc2. Stated differently, the value of third power-supply voltage Vcc3 is greater than the value of first power-supply voltage Vcc1 and is greater than the value of second power-supply voltage Vcc2. Either a fixed power-supply voltage or a variable power-supply voltage may be used as third power-supply voltage Vcc3, as with first power-supply voltage Vcc1 and second power-supply voltage Vcc2. For example, voltages fixed to 3 V, 4 V, and 5 V may be used as first power-supply voltage Vcc1, second power-supply voltage Vcc2, and third power-supply voltage Vcc3, respectively.

Note that the value of third power-supply voltage Vcc3 in the present embodiment is greater than the value of second power-supply voltage Vcc2, but the present embodiment is not limited to this. For example, the value of third power-supply voltage Vcc3 may be the same as the value of second power-supply voltage Vcc2.

Filter 61A has a passband that supports the communication band of first radio frequency signal s1, the communication band of second radio frequency signal s2, and the communication band of third radio frequency signal s3. Stated differently, filter 61A passes first radio frequency signal s1, second radio frequency signal s2, and third radio frequency signal s3. Filter 61A according to the present embodiment is connected between antenna connection terminal 101 and power amplifier 11A.

Non-limiting examples of filter 61A include an acoustic wave filter utilizing SAW, an acoustic wave filter utilizing BAW, an LC resonant filter, and a dielectric filter, or any combination of these filters.

Note that filter 61A, antenna connection terminal 101, and transmission input terminal 111 are not essential structural elements of radio frequency circuit 1A according to the present embodiment.

2.2 Operation of Communication Device 5A

Figure 7:
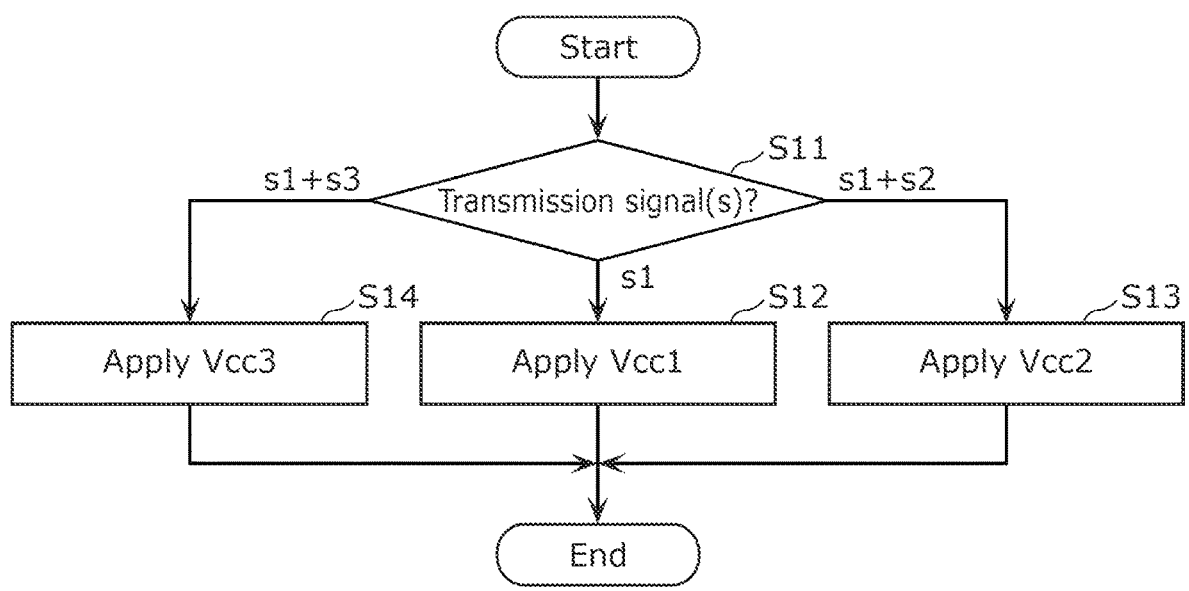
FIG. 7 is a flowchart of the operation performed by the communication device according to Embodiment 2.
Figure 8:
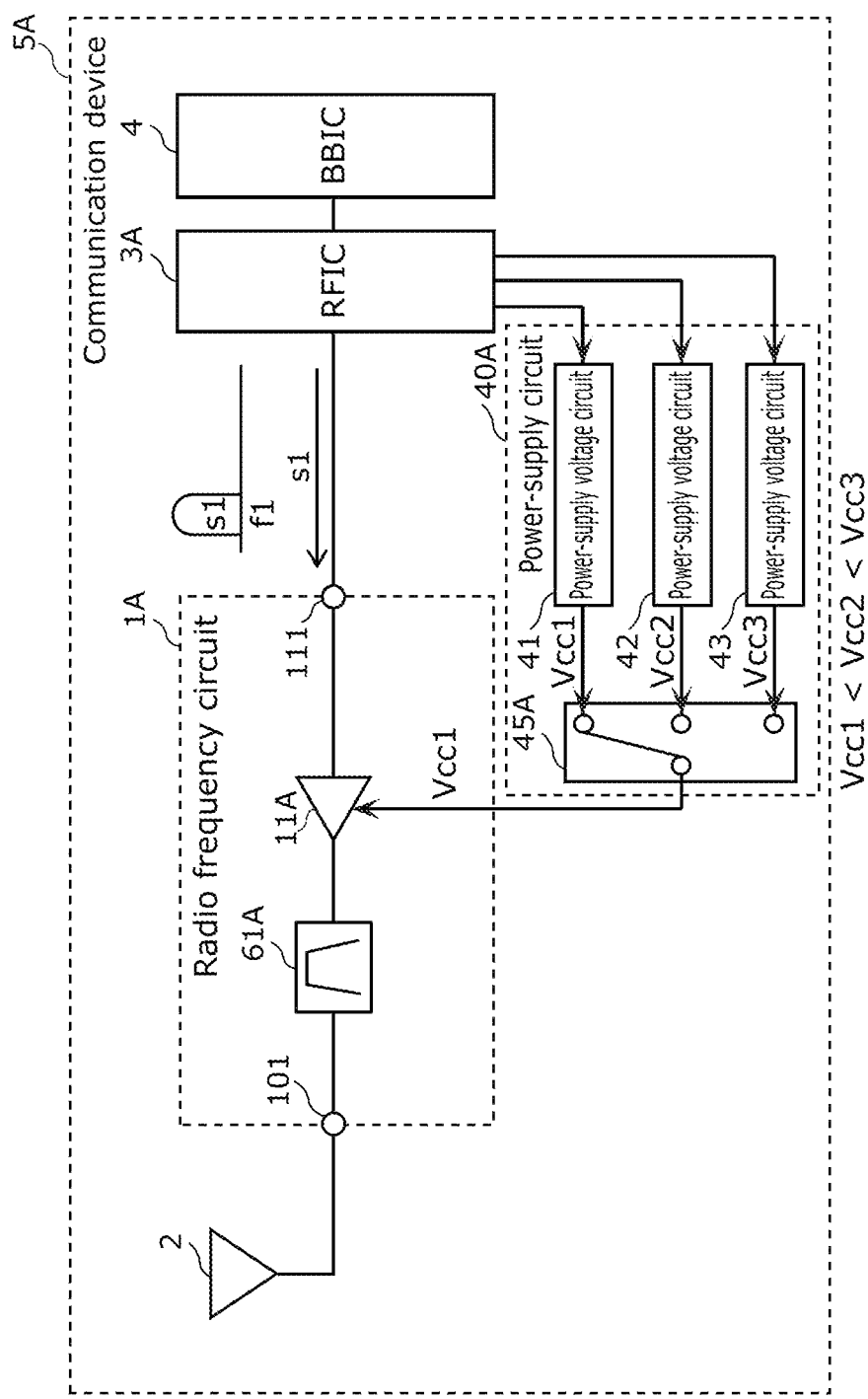
FIG. 8 is a circuit diagram showing a connection status of the communication device that is transmitting a first radio frequency signal in Embodiment 2.
Figure 9:
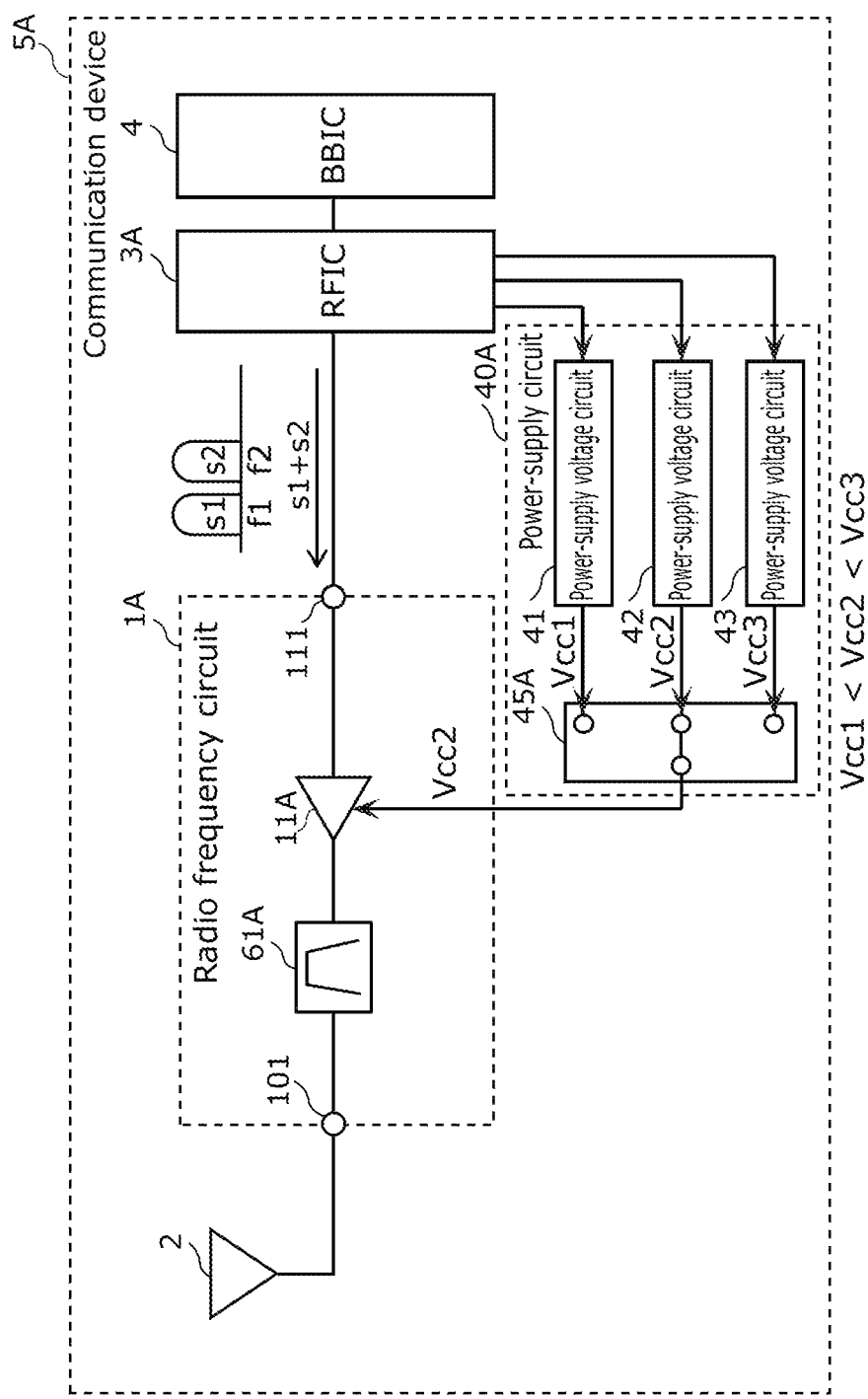
FIG. 9 is a circuit diagram showing a connection status of the communication device that is simultaneously transmitting the first radio frequency signal and a second radio frequency signal in Embodiment 2.
Figure 10:
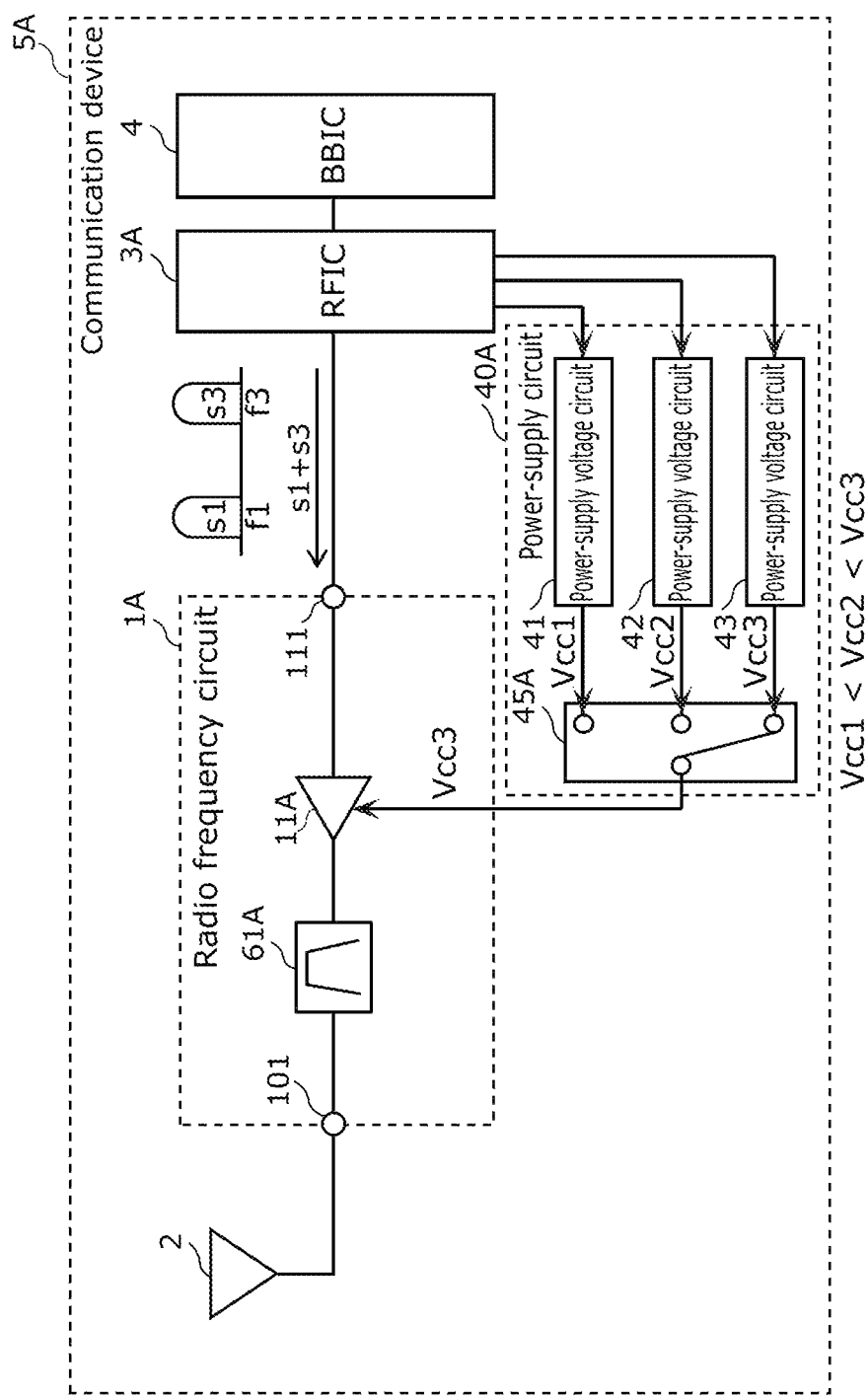
FIG. 10 is a circuit diagram showing a connection status of the communication device that is simultaneously transmitting the first radio frequency signal and a third radio frequency signal in Embodiment 2.

With reference to FIG. 7 through FIG. 10, the operation performed by communication device 5A with the above configuration will be described. FIG. 7 is a flowchart of the operation performed by communication device 5A according to Embodiment 2. FIG. 8 is a circuit diagram showing a connection status of communication device 5A that is transmitting first radio frequency signal s1 in Embodiment 2. FIG. 9 is a circuit diagram showing a connection status of communication device 5A that is simultaneously transmitting first radio frequency signal s1 and second radio frequency signal s2 in Embodiment 2. FIG. 10 is a circuit diagram showing a connection status of communication device 5A that is simultaneously transmitting first radio frequency signal s1 and third radio frequency signal s3 in Embodiment 2.

First, as shown in FIG. 7, transmission signal(s) is judged (S11). Here, in the case where the transmission signal is first radio frequency signal s1 (s1 in S11), first power-supply voltage Vcc1 is applied to power amplifier 11A (S12). As shown in FIG. 8, for example, in the case where first radio frequency signal s1 is inputted from RFIC 3A to transmission input terminal 111, switch 45A connects power amplifier 11A and power-supply voltage circuit 41, as a result of which first power-supply voltage Vcc1 is applied to power amplifier 11A.

In the case where the transmission signals are first radio frequency signal s1 and second radio frequency signal s2 (s1+s2 in S11), second power-supply voltage Vcc2 is applied to power amplifier 11A (S13). As shown in FIG. 9, for example, in the case where first radio frequency signal s1 and second radio frequency signal s2 are inputted from RFIC 3A to transmission input terminal 111, switch 45A connects power amplifier 11A and power-supply voltage circuit 42, as a result of which second power-supply voltage Vcc2 is applied to power amplifier 11A.

In the case where the transmission signals are first radio frequency signal s1 and third radio frequency signal s3 (s1+s3 in S11), third power-supply voltage Vcc3 is applied to power amplifier 11A (S14). As shown in FIG. 10, for example, in the case where first radio frequency signal s1 and third radio frequency signal s3 are inputted from RFIC 3A to transmission input terminal 111, switch 45A connects power amplifier 11A and power-supply voltage circuit 43, as a result of which third power-supply voltage Vcc3 is applied to power amplifier 11A.

Note that the judgment and control in the steps in FIG. 7 may be performed, for example, by a controller (not illustrated) in RFIC 3A or may be performed by a controller (not illustrated) included in radio frequency circuit 1A.

As described above, in radio frequency circuit 1A according to the present embodiment, power amplifier 11A is further capable of amplifying third radio frequency signal s3 that has a frequency different from the frequency of first radio frequency signal s1 and the frequency of the second radio frequency signal s2. Here, the difference between the frequency of first radio frequency signal s1 and the frequency of third radio frequency signal s3 is greater than the difference between the frequency of first radio frequency signal s1 and the frequency of second radio frequency signal s2. Power amplifier 11A uses third power-supply voltage Vcc3 to amplify both first radio frequency signal s1 and third radio frequency signal s3 together. The value of third power-supply voltage Vcc3 is greater than the value of first power-supply voltage Vcc1 and the value of second power-supply voltage Vcc2.

This configuration enables the use of third power-supply voltage Vcc3 that is higher than the other power-supply voltages to amplify, together with first radio frequency signal s1, third radio frequency signal s3 having frequency f3 that is more distant from frequency f1 of first radio frequency signal s1 than from frequency f2 of second radio frequency signal s2. The greater the difference between the frequencies of two radio frequency signals, the greater the difference between the peak power and the average power of the multiplexed signal of such two radio frequency signals. Consequently, a back-off margin necessary to amplify the multiplexed signal increases. As such, the reduction in a transmission power is more effectively inhibited by increasing a power-supply voltage to be applied to power amplifier 11A, in accordance with an increase in the back-off margin, to expand the linear region.

Embodiment 3

The following describes Embodiment 3. The present embodiment is different from Embodiment 1 mainly in that the radio frequency circuit includes a reception circuit. The following focuses on the difference from Embodiment 1 to describe the present embodiment with reference to the drawings.

Figure 11:
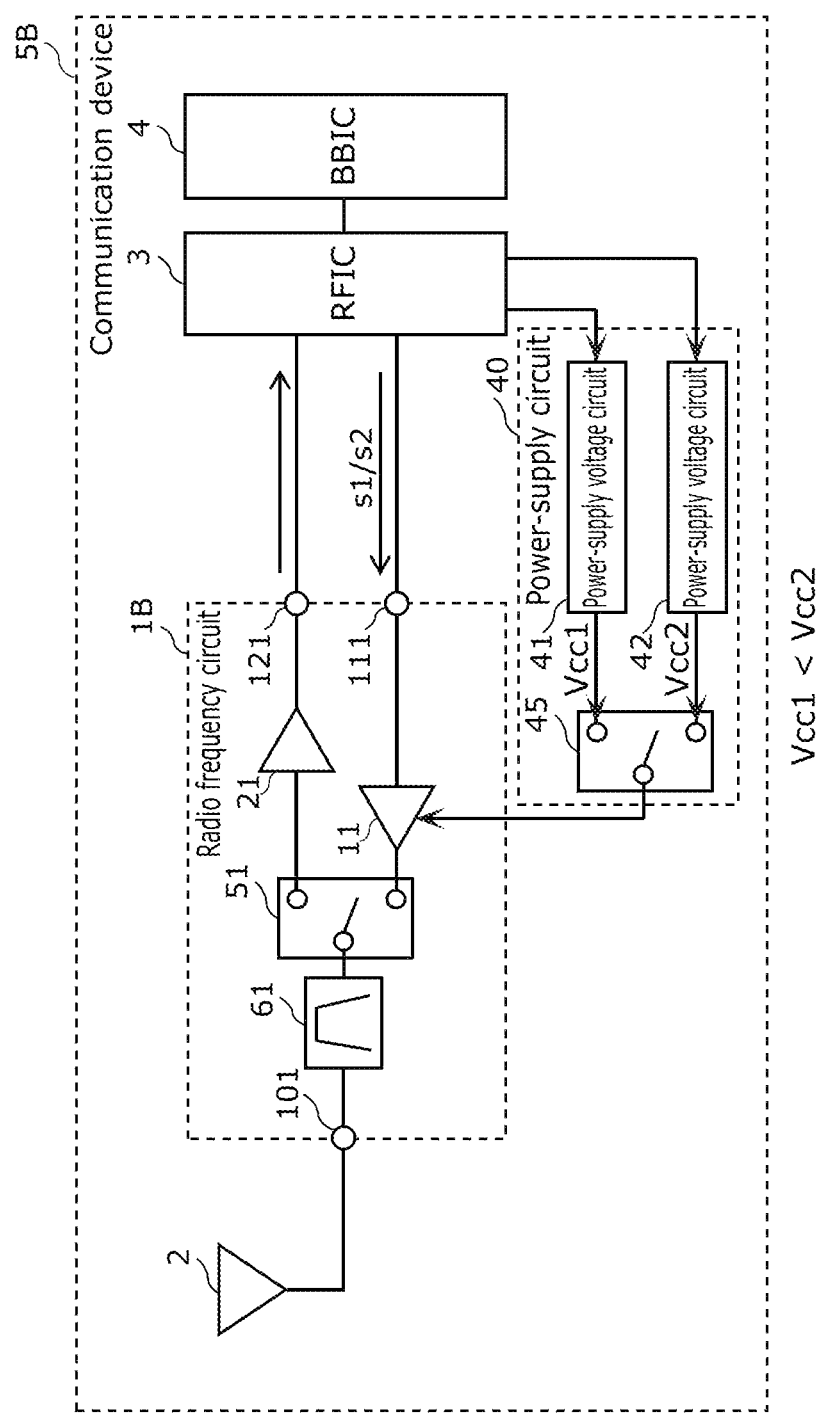
FIG. 11 is a diagram showing the circuit configurations of a radio frequency circuit and a communication device according to Embodiment 3.

FIG. 11 is a diagram showing the circuit configurations of radio frequency circuit 1B and communication device 5B according to Embodiment 3. Communication device 5B includes radio frequency circuit 1B, antenna 2, RFIC 3, BBIC 4, and power-supply circuit 40. Radio frequency circuit 1B includes low-noise amplifier 21, switch 51, and reception output terminal 121, in addition to power amplifier 11, filter 61, antenna connection terminal 101, and transmission input terminal 111.

Low-noise amplifier 21 is connected to filter 61 via switch 51. Low-noise amplifier 21 performs low-noise amplification on a radio frequency signal received by antenna 2, and outputs the resulting radio frequency signal to reception output terminal 121.

Switch 51 switches between connecting filter 61 and power amplifier 11, and between filter 61 and low-noise amplifier 21. Switch 51 is connected between filter 61 and power amplifier 11 and between filter 61 and low-noise amplifier 21. More specifically, switch 51 includes a common terminal connected to filter 61, a first terminal connected to power amplifier 11, and a second terminal connected to low-noise amplifier 21. Having such connection structure, switch 51 connects one of the first terminal and the second terminal to the common terminal on the basis of a control signal from, for example, RFIC 3. This enables to switch between filter 61 and power amplifier 11, and between filter 61 and low-noise amplifier 21, thus enabling time division duplex (TDD). Switch 51 is implemented, for example, as an SPDT switch circuit.

As described above, radio frequency circuit 1B according to the present embodiment includes the reception circuit, thereby enabling the use of TDD as a duplex mode.

EXAMPLE

The following describes radio frequency module 6 according to an example. Radio frequency module 6 according to the present example includes radio frequency circuit 1, 1A, or 1B, and power-supply circuit 40 or 40A according to Embodiment 1, 2, or 3. Radio frequency module 6 is included in communication device 5, 5A, or 5B.

Figure 12:
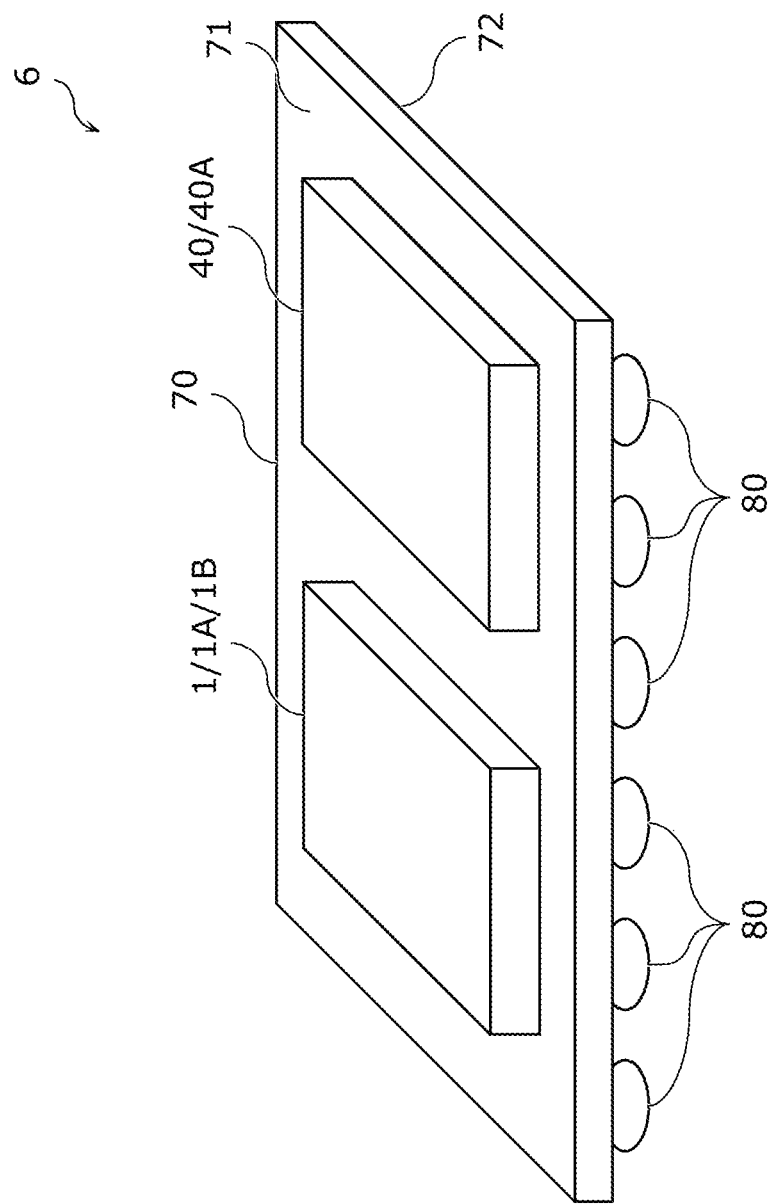
FIG. 12 is a perspective view of a radio frequency module according to an example.

FIG. 12 is a perspective view of radio frequency module 6 according to the present example. Radio frequency module 6 includes radio frequency circuit 1, 1A, or 1B, power supply-circuit 40 or 40A, module substrate 70, and a plurality of external-connection terminals 80.

As shown in FIG. 12, module substrate 70 includes principal surfaces 71 and 72 that are opposite to each other. Non-limiting examples of module substrate 70 to be used include: a low temperature co-fired ceramics (LTCC) substrate including stacked dielectric layers; a high temperature co-fired ceramics (HTCC) substrate including stacked dielectric layers; a component-embedded substrate; a substrate having a redistribution layer (RDL); and a printed circuit board.

Radio frequency circuit 1, 1A, or 1B, and power-supply circuit 40 or 40A are disposed on principal surface 71, and a plurality of external-connection terminals 80 are disposed on principal surface 72.

A plurality of external-connection terminals 80, which are implemented as bump electrodes, for example, are connected to an input-output terminal and/or a ground terminal, and so forth on the mother board (not illustrated) that is disposed at the side of principal surface 72 of module substrate 70. A plurality of external-connection terminals 80 are implemented, for example, as antenna connection terminal 101, transmission input terminal 111, and reception output terminal 121, or any combination of these terminals.

Note that radio frequency module 6 shown in FIG. 12 is a mere example and thus the present disclosure is not limited to this. For example, radio frequency module 6 may be packaged by a resin member, etc. Also, a part or the entirety of radio frequency circuit 1, 1A, or 1B, and/or a part or the entirety of power-supply circuit 40 or 40A may be disposed on principal surface 72 of radio frequency module 6. Also, each of external-connection terminals 80 is not limited to a bump electrode, and thus may be a post electrode, a metal electrode for wire bonding (bonding pad), or may be any combination of these electrodes.

ANOTHER EMBODIMENT

The radio frequency circuit, the radio frequency module, and the communication device according to the present disclosure have been described above, using the embodiments, but the radio frequency circuit, the radio frequency module, and the communication device according to the present disclosure are not limited to such embodiments. The present disclosure also includes: another embodiment achieved by freely combining structural elements in the embodiments; variations achieved by making various modifications to the embodiments that can be conceived by those skilled in the art without departing from the essence of the present disclosure; and various devices that include the radio frequency circuit and the communication device described above.

For example, in the radio frequency circuit and the communication device according to the foregoing embodiments, another circuit element, wiring, and so forth may be interposed on a path that connects each circuit element and a signal path disclosed in the drawings. In the foregoing embodiments, for example, an impedance matching circuit may be interposed between the power amplifier and the filter.

Although not particularly described in detail in the foregoing embodiments, the power amplifier is not limited to having a particular configuration. For example, the power amplifier may include a plurality of cascaded amplifiers and/or a differential amplifier. In the case where the power amplifier is implemented as a plurality of cascaded amplifiers, the first power-supply voltage, the second power-supply voltage, etc. in the foregoing embodiments may be applied to at least one of such plurality of amplifiers.

Note that first radio frequency signal s1, second radio frequency signal s2, and third radio frequency signal s3 in the foregoing embodiments may be signals that have been modulated, using the same modulating signal. The modulating signal is, for example, a signal that includes information to be transmitted.

Note that TDD is used in Embodiment 3 as a duplex mode, but the present disclosure is not limited to this. For example, frequency division duplex (FDD) may thus be used. In this case, radio frequency circuit 1B may include a duplexer instead of switch 51 and filter 61. Examples of communication bands to be used include: Band 71 for LTE (uplink: 663-698 MHz, downlink: 617-652 MHz) and n71 for 5G NR (uplink: 663-698 MHz, downlink: 617-652 MHz); and Band 11 for LTE (1427.9-1447.9 MHz) or Band 21 for LTE (1447.9-1462.9 MHz) and n74 for 5G NR (1427-1470 MHz).

Note that the power-supply voltages to power amplifier 11 are adjusted in the foregoing embodiments, but bias signal adjustment may be performed instead of power-supply voltage adjustment. More specifically, power amplifier 11 or 11A may use the first bias signal to amplify one of first radio frequency signal s1 and second radio frequency signal s2, and may use the second bias signal to amplify both first radio frequency signal s1 and second radio frequency signal s2 together. Here, the current value or the voltage value of the second bias signal may be greater than that of the first bias signal.

This achieves the same effects as those achieved by the foregoing embodiments in which power-supply voltages are adjusted.

Figure 13:
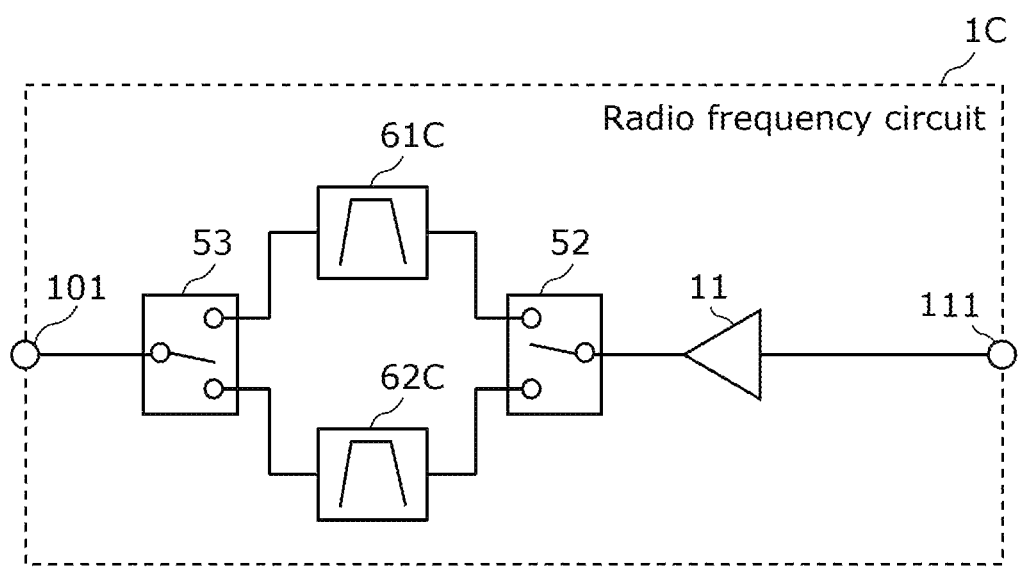
FIG. 13 is a diagram showing the circuit configuration of a radio frequency circuit according to another embodiment.

Note that the radio frequency circuit according to the foregoing embodiments includes one filter, but may include two filters, for example, as shown in FIG. 13. FIG. 13 is a diagram showing the circuit configuration of radio frequency circuit 1C according to another embodiment. Radio frequency circuit 1C includes power amplifier 11, filters 61C and 62C, and switches 52 and 53.

In the case where first radio frequency signal s1 is solely amplified, switch 52 connects the output end of power amplifier 11 to one end of filter 61C, and switch 53 connects the other end of filter 61C to antenna connection terminal 101. Here, switch 52 does not connect the output end of power terminal 11 to one end of filter 62C, and switch 53 does not connect the other end of filter 62C to antenna connection terminal 101.

In the case where second radio frequency signal s2 is solely amplified, switch 52 connects the output end of power amplifier 11 to one end of filter 62C, and switch 53 connects the other end of filter 62C to antenna connection terminal 101. Here, switch 52 does not connect the output end of power terminal 11 to one end of filter 61C, and switch 53 does not connect the other end of filter 61C to antenna connection terminal 101.

In the case where both first radio frequency signal s1 and second radio frequency signal s2 are amplified together, switch 52 connects the output end of power amplifier 11 to both one end of filter 61C and one end of filter 62C, and switch 53 connects both the other end of fitter 61C and the other end of filter 62C to antenna connection terminal 101.

Filter 61C has a passband that supports the communication band of first radio frequency signal s1. Filter 62C has a passband that supports the communication band of second radio frequency signal s2. This configuration further attenuates unnecessary signal components, in the case where first radio frequency signal s1 or second radio frequency signals s2 is solely amplified, as well as improving the signal-to-noise (SN) ratio of first radio frequency signal s1 or second radio frequency signals s2.

Note that filter 61C or 62C may have a passband that supports both the communication band of first radio frequency signal s1 and the communication band of second radio frequency signal s2. For example, filter 61C may have a passband that supports first radio frequency signal s1 and second radio frequency signal s2 in the case where both first radio frequency signal s1 and second radio frequency signal s2 are amplified together. In this case, filter 62C may have a passband that supports one of first radio frequency signal s1 and second radio frequency signal s2 in the case where one of first radio frequency signal s1 and second radio frequency signal s2 is solely amplified.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure is widely applicable for use in communication devices (e.g., a mobile phone) as a radio frequency circuit that is placed at the front-end portion.

The invention claimed is:

1. A radio frequency circuit, comprising:
an amplifier configured to amplify a first radio frequency signal and a second radio frequency signal that has a frequency different from a frequency of the first radio frequency signal,
wherein the amplifier is configured to use a first power-supply voltage to amplify one of the first radio frequency signal or the second radio frequency signal and to use a second power-supply voltage to amplify both the first radio frequency signal and the second radio frequency signal together, and
a value of the second power-supply voltage is greater than a value of the first power-supply voltage.

2. The radio frequency circuit according to claim 1,
wherein the first radio frequency signal and the second radio frequency signal are radio frequency signals of different channels included in a same communication band for a same communication system.

3. The radio frequency circuit according to claim 2,
wherein the same communication band for the same communication system is one of n77, n41, or n74 for 5th Generation New Radio (5G NR), or an unlicensed band of 5 GHz or greater.

4. The radio frequency circuit according to claim 1,
wherein the first radio frequency signal and the second radio frequency signal are radio frequency signals of different channels included in different communication bands for different communication systems.

5. The radio frequency circuit according to claim 4,
wherein the different communication bands for the different communication systems include one of n77, n41, or n74 for 5G NR, or an unlicensed band of 5 GHz or greater.

6. The radio frequency circuit according to claim 1,
wherein the first radio frequency signal and the second radio frequency signal are radio frequency signals of different channels included in a same communication band for different communication systems.

7. The radio frequency circuit according to claim 6,
wherein the same communication band for the different communication systems is Band 41 for Long Term Evolution (LTE) and n41 for 5G NR.

8. The radio frequency circuit according to claim 1,
wherein the first radio frequency signal and the second radio frequency signal are radio frequency signals of different channels included in different communication bands for a same communication system.

9. The radio frequency circuit according to claim 8,
wherein the different communication bands for the same communication system are n77 and n78 for 5G NR.

10. The radio frequency circuit according to claim 1,
wherein the amplifier is configured to
operate in one of an envelope tracking mode and an average power tracking mode to amplify one of the first radio frequency signal or the second radio frequency signal, and operate in a remaining one of the envelope tracking mode and the average power tracking mode to amplify both the first radio frequency signal and the second radio frequency signal together.

11. The radio frequency circuit according to claim 10, wherein the amplifier is configured to operate in the envelope tracking mode to amplify one of the first radio frequency signal or the second radio frequency signal, and operate in the average power tracking mode to amplify both the first radio frequency signal and the second radio frequency signal together.

12. The radio frequency circuit according to claim 10, wherein the amplifier is configured to operate in the average power tracking mode to amplify one of the first radio frequency signal and the second radio frequency signal, and operate in the envelope tracking mode to amplify both the first radio frequency signal and the second radio frequency signal together.

13. The radio frequency circuit according to claim 1, wherein the amplifier is further configured to amplify a third radio frequency signal that has a frequency different from the frequency of the first radio frequency signal and the frequency of the second radio frequency signal, a difference between the frequency of the first radio frequency signal and the frequency of the third radio frequency signal is greater than a difference between the frequency of the first radio frequency signal and the frequency of the second radio frequency signal, the amplifier is configured to use the third power-supply voltage to amplify both the first radio frequency signal and the third radio frequency signal together, and a value of the third power-supply voltage is greater than the value of the first power-supply voltage and the value of the second power-supply voltage.

14. The radio frequency circuit according to claim 1, wherein the amplifier is configured to support Power Class 1.5 or Power Class 2 to amplify both the first radio frequency signal and the second radio frequency signal together using the second power-supply voltage.

15. The radio frequency circuit according to claim 1, wherein to amplify both the first radio frequency signal and the second radio frequency signal together, the amplifier is configured to use (i) a first bias signal under a condition that a channel bandwidth of the first radio frequency signal and a channel bandwidth of the second radio frequency signal are identical, and (ii) a second bias signal that is different from the first bias signal under a condition that the channel bandwidth of the first radio frequency signal and the channel bandwidth of the second radio frequency signal are different.

16. A radio frequency module, comprising:
the radio frequency circuit according to claim 1; and
a power-supply circuit configured to output the first power-supply voltage and the second power-supply voltage to the amplifier.

17. A communication device, comprising:
a signal processing circuit configured to process a radio frequency signal; and
the radio frequency circuit according to claim 1, configured to transfer the radio frequency signal between the signal processing circuit and an antenna.

18. A radio frequency circuit, comprising:
an amplifier configured to amplify a first radio frequency signal and a second radio frequency signal that has a frequency different from a frequency of the first radio frequency signal, wherein the amplifier is configured to use a first bias signal to amplify one of the first radio frequency signal and the second radio frequency signal and to use a second bias signal to amplify both the first radio frequency signal and the second radio frequency signal together, and a current value or a voltage value of the second bias signal is greater than a current value or a voltage value of the first bias signal.

19. A radio frequency module, comprising:
the radio frequency circuit according to claim 18; and
a power-supply circuit configured to output the first power-supply voltage and the second power-supply voltage to the amplifier.

20. A communication device, comprising:
a signal processing circuit configured to process a radio frequency signal; and
the radio frequency circuit according to claim 18, configured to transfer the radio frequency signal between the signal processing circuit and an antenna.

* * * * *